(12) United States Patent
Cheng et al.

(10) Patent No.: US 10,371,967 B2
(45) Date of Patent: Aug. 6, 2019

(54) PREDEFINED REFLECTIVE APPEARANCE EYEWEAR LENS WITH BALANCE CHROMA ENHANCEMENT VISUAL PERCEPTION

(71) Applicant: Hwa Meei Optical Co., Ltd., Tainan (TW)

(72) Inventors: Charles Cheng, Tainan (TW); Chih Ming Chen, Tainan (TW)

(73) Assignee: HWA MEEI OPTICAL CO., LTD., Tainan (TW)

( * ) Notice: Subject to any disclaimer, the term of this patent is extended or adjusted under 35 U.S.C. 154(b) by 112 days.

(21) Appl. No.: 15/841,322

(22) Filed: Dec. 14, 2017

(65) Prior Publication Data

US 2018/0321516 A1 Nov. 8, 2018

(30) Foreign Application Priority Data

May 8, 2017 (TW) .............................. 106115155 A

(51) Int. Cl.
*G02C 7/10* (2006.01)
*G02C 7/12* (2006.01)

(52) U.S. Cl.
CPC ............. *G02C 7/104* (2013.01); *G02C 7/102* (2013.01); *G02C 7/107* (2013.01); *G02C 7/12* (2013.01)

(58) Field of Classification Search
CPC ........ G02C 7/104; G02C 7/102; G02C 7/107; G02C 7/12
USPC .................................................... 351/159.56
See application file for complete search history.

(56) References Cited

U.S. PATENT DOCUMENTS

| 5,190,896 A * | 3/1993 | Pucilowski | C03C 3/095 |
| | | | 501/64 |
| 7,106,509 B2 * | 9/2006 | Sharp | G02B 5/3041 |
| | | | 351/159.6 |
| 8,770,749 B2 * | 7/2014 | McCabe | G02C 7/104 |
| | | | 351/159.65 |
| 9,933,636 B2 * | 4/2018 | Sharp | G02B 5/3083 |
| 10,073,282 B2 * | 9/2018 | Saylor | G02C 7/101 |
| 2013/0141693 A1 * | 6/2013 | McCabe | G02C 7/104 |
| | | | 351/159.56 |
| 2016/0048037 A1 * | 2/2016 | McCabe | G02C 7/104 |
| | | | 351/159.66 |

(Continued)

*Primary Examiner* — William R Alexander
(74) *Attorney, Agent, or Firm* — Bruce Stone LLP; Joseph Bruce

(57) ABSTRACT

Provided is an eyewear lens, including a lens substrate and an optical interference coating; the lens substrate is comprised of an optical material, and the optical interference coating is bonded to the lens substrate and is stacked by the composition of high and low reflectivity materials. A predefined reflective appearance color will be formed by light getting through the optical interference coating. The lens substrate contains another filter on one side surface or both side surfaces or inside the lens substrate which is complementary to the light after penetrating the optical interference coating such that the overall transmittance light tone remain neutral balance. The overall transmittance light spectrum has three pass-bands corresponding to the maximum response of the human eye cone cells, and the relatively high transmittance values of each pass-band center are approximately at 450 nm, 530 nm and 610 nm. The FWHM of each pass-band is between 3 nm and 50 nm.

16 Claims, 22 Drawing Sheets

(56) References Cited

U.S. PATENT DOCUMENTS

| | | | |
|---|---|---|---|
| 2016/0070119 A1* | 3/2016 | McCabe | G02C 7/104 |
| | | | 351/159.56 |
| 2017/0075143 A1* | 3/2017 | Saylor | G02C 7/104 |
| 2017/0102558 A1* | 4/2017 | Saylor | G02C 7/12 |
| 2017/0139234 A1* | 5/2017 | Sharp | G02B 5/3083 |
| 2017/0205639 A1* | 7/2017 | McCabe | G02C 7/104 |

* cited by examiner

PREDEFINED REFLECTIVE APPEARANCE EYEWEAR LENS WITH BALANCE CHROMA ENHANCEMENT VISUAL PERCEPTION

CROSS-REFERENCE TO RELATED APPLICATION

This application claims the priority of Taiwanese patent application No. 106115155, filed on May 8, 2017, which is incorporated herewith by reference.

BACKGROUND OF THE INVENTION

1. Field of the Invention

The present disclosure relates to an eyewear lens and more specifically to a spectacle lens having predefined different reflective appearance colors with balance chroma enhancement visual perception.

2. Description of Related Art

The main functions of sunglasses used in outdoor activities or driving are to adjust the intensity of sunlight and to prevent UV damage from the eyes. At the same time, a sunglass is also an important accessory to people in the overall clothing. Consumers will be attracted to the frame shape and exterior color, will consider whether the glasses and the overall fashion modeling are matched, and then try to have visual perception by seeing through the lenses.

Generally, the color of the untreated glass or resin lenses is a transparent primary color. Moreover, since the intensity of sunlight is required to be adjusted, colored dye materials are added in sunglasses lenses and/or uniform or gradient color of dye is added on the surface of sunglasses lenses. In another method, a light reflective and absorptive metal (such as: chromium) is coated on the surface of a lens so as to produce a metallic flash appearance. In addition, the most popular method is to coat high-reflective optical interference layers predefining their hues, and thus producing different colors like a similar butterfly wings and a metallic luster reflective appearance.

Moreover, advances in sunglasses technology have also begun to emphasize that the scenery seen under sunlight has the function of enhancing color contrast by stimulating the wearer through a lens based on adjusting the relative optical transmission of a lens to three primary colors (red, green and blue) of the human eye's cones in the visible region of visible light.

U.S. Pat. No. 4,826,286 discloses a filtering system having an optical interference filter coating that is stacked by using the composition of high and low reflectivity materials. Light pass through the filter coating with the relative high intensity in the spectrums 450 nm (Blue), 530 nm (Green) and 610 nm (Red); that is, while the full width at half maximum (FWHM) is between 3 nm and 50 nm, a relatively high penetration of light intensity is able to achieve the function of increasing color visual perception. The light which is filtered by interference coating will be transformed into the reflective light so as to show a fixed (usually gray) appearance color of a lens. Such prior art does not provide customers with the choice of a variety of lens appearances and also does not have the effect of enhancing the exterior color with chromaticity.

In addition, U.S. Pat. No. 7,556,376 and JP Patent JP2013-083839A disclose that the effect of filtering can be achieved by mean of adding different color dyes in a resin lens (for example, polycarbonate lens) that absorbs a specified wavelength light so as to enable the overall transmittance light to have relatively high or low intensity pass-bands (Blue or Green). When the color dye is used to absorb the transmittance light and to adjust the hue of the lens, the colors on both sides of the lens will be fixed and will be the same; that is, when a consumer selects a color of a spectacle lens, the visual sensation colors will be the same. Likewise, if the consumer chooses a metallic luster color-coated eyewear lens, such as a blue appearance, the internal visual sensation color of the lens will turn into yellow so as not to have the best balance color contrast enhancement function corresponding to the three primary colors (RGB color stimulation) of eye cone cells. As a result, those prior arts cause consumers in the purchase of sunglasses; the stylish lens appearance and best balance color enhancement visual perception cannot be obtained simultaneously.

SUMMARY OF THE INVENTION

In light of the foregoing problems, an objective of the present disclosure is to provide a spectacle lens having predefined different reflective appearance colors such that consumers can choose a preferred lens appearance with a balance chroma enhancement function visual perception in all color space (between red-green complementally and between blue-yellow complementally) by seeing through the lenses In order to achieve the above objective, the present disclosure provides a predefined reflective appearance eyewear lens with balance chroma enhancement visual perception, including a lens substrate and an optical interference coating, wherein the lens substrate is comprised of an optical material, the optical interference coating is bonded to the lens substrate and is stacked by means of high and low reflective index materials, light passes through the optical interference coating to produce a reflective appearance color predefined, wherein at least one side surface of the lens substrate, both side surfaces of the lens substrate or inside of the lens substrate comprises at least another filter layer and its filtered light is complementary to the light after passing through the optical interference coating to maintain the overall transmittance light color neutral balance of the lens. Further, the overall transmittance light spectrum has three pass-bands corresponding to the maximum color response of the human eye cone cells, and the relatively high transmittance values of the center of each pass-band are at 420 nm~480 nm, 500 nm~560 nm and 580 nm~640 nm; specifically at 450 nm, 530 nm and 610 nm. The full width at half maximum (FWHM) of each pass-band is between 3 nm and 50 nm, wherein the reflected light spectrum chromaticity coordinates (Rx, Ry) of the reflective appearance color located within the outside of a neutral balance elliptical parameter equation in the CIE 1931 XY color space chromaticity coordinates, and the overall transmittance spectrum chromaticity coordinates (Tx, Ty) of the lens located within the inside of the neutral balance elliptical parameter equation in the CIE 1931 XY color space chromaticity, where the elliptical parameter equation is expressed as follows:

$$\begin{cases} x = a\cos(t)\,\cos(\theta) - b\sin(t)\,\sin(\theta) + h \\ y = a\cos(t)\,\sin(\theta) + b\sin(t)\,\cos(\theta) + k \end{cases}$$

where: t is the radian parameter between 0~2π;
θ is the elliptical rotating radian (0.66);
a, b are two radii of an ellipse (a is 0.07, b is 0.04);
h and k are the elliptical center coordinates, that is, (h, k)=(0.34, 0.32).

In a preferred embodiment of the present disclosure, the overall transmittance spectrum has three pass-bands (i.e., 420 nm~480 nm, 500 nm~560 nm and 580 nm~640 nm; preferably, 450 nm, 530 nm and 610 nm), and the relatively high transmittance value at the center of each pass-band being at least 5% greater than the transmittance value on both bottom sides of each pass-band.

Preferably, the reflective appearance color of the lens is produced by the optical interference coating and another filter layer contained in the lens substrate is comprised of at least one dye.

Preferably, the dye is combined with the lens substrate by mean of dipping, painting or pre-mixing.

Preferably, the dye may have a polarizing effect.

Preferably, the dye may also have a photochromic effect.

Preferably, the reflective appearance color of the lens is produced by the optical interference coating and another filter layer contained in the lens substrate is comprised of at least one color filter sheet.

Preferably, the color filter sheet is combined with the lens substrate by in-mold casting, in-mold injection or laminating adhesive.

Preferably, the color filter sheet may have a polarizing effect.

Preferably, the color filter sheet may also have a photochromic effect.

Preferably, the reflective appearance color of the lens is produced by the optical interference coating and another filter layer contained in the lens substrate is comprised of another optical interference coating.

Preferably, the optical interference coating is combined with the lens substrate by vacuum vapor deposition or spinning coating.

Preferably, the material of the lens substrate may be a polymeric resin or a glass.

Preferably, the lens substrate may be formed by casting molding, injection molding or cutting and polishing.

Preferably, the lens substrate may be a plano lens, a semi finished lens or a prescription lens.

Preferably, the lens is suitable for use in sunglasses, sport eyewear, safety goggles, swimming goggles or skiing goggles.

DETAILED DESCRIPTION OF THE PREFERRED EMBODIMENT

Figure 1:
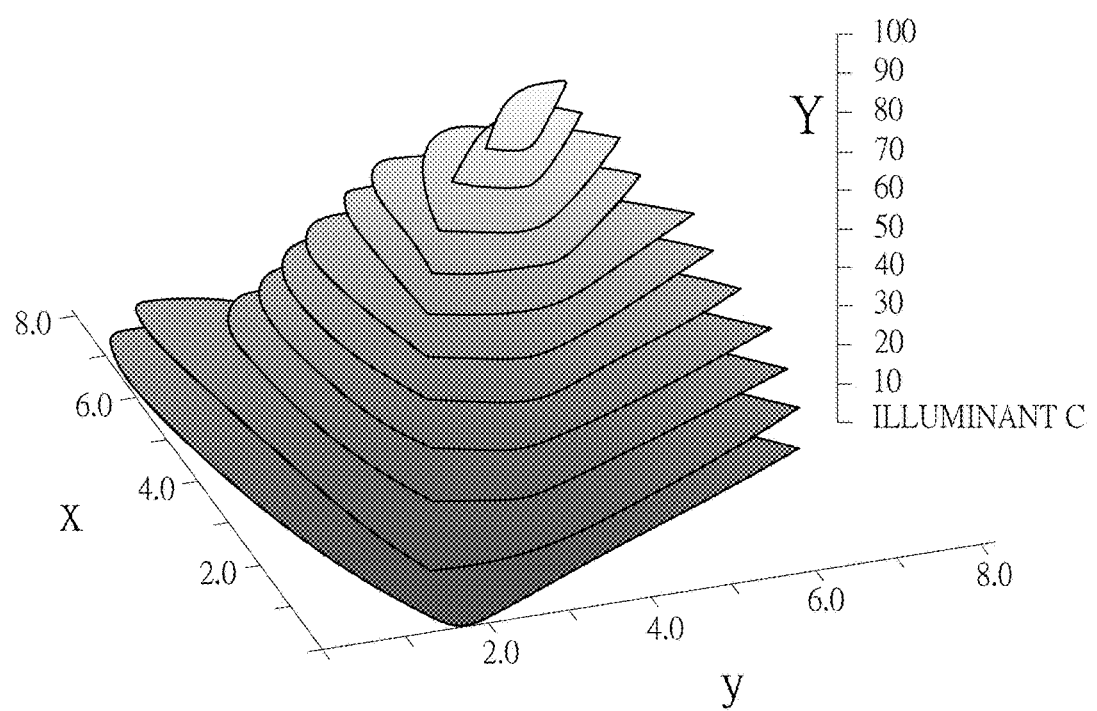
FIG. 1 shows a CIE 1931 XY chromaticity diagram of the human eye at different brightness values perceived to the maximum color gamut range.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

There are many kinds of coordinate systems used in chromatics to represent color or neutral balance. The present disclosure adopts industry-wide standards, that is, in the D65 standard light source irradiation, the color characteristics of a lens are described and defined in the coordinates (x, y) of the CIE 1931 XY color space chromaticity coordinate system according to the inventive concept and embodiment of the present disclosure. The inventions of the same concept as the present invention are described by different coordinate systems, and it is easy to determine whether or not to fall within the scope disclosed by the present disclosure based on simply performing the mathematical conversion a color coordinate system.

Light is the primary condition that human eye can see the object. However, even if there are regulatory mechanisms of eyelids, pupils and visual cell adaption, the range of light changes in a day is often beyond the scope that human eye can adapt. The illumination at sunny noon will usually reach hundreds of thousands of lumens. Such an environment not only makes the eyes feel uncomfortable, and in such a high brightness environment, the perceived range of color is also narrowed, as shown in FIG. 1. Therefore, Sunglasses or skiing goggles and other products came into being. In different environments, people can choose the appropriate perspective glasses, the ambient light to the human eye can be pre-filtered and can be adjusted to the most comfortable range. According, people can see the richest color.

Figure 2:
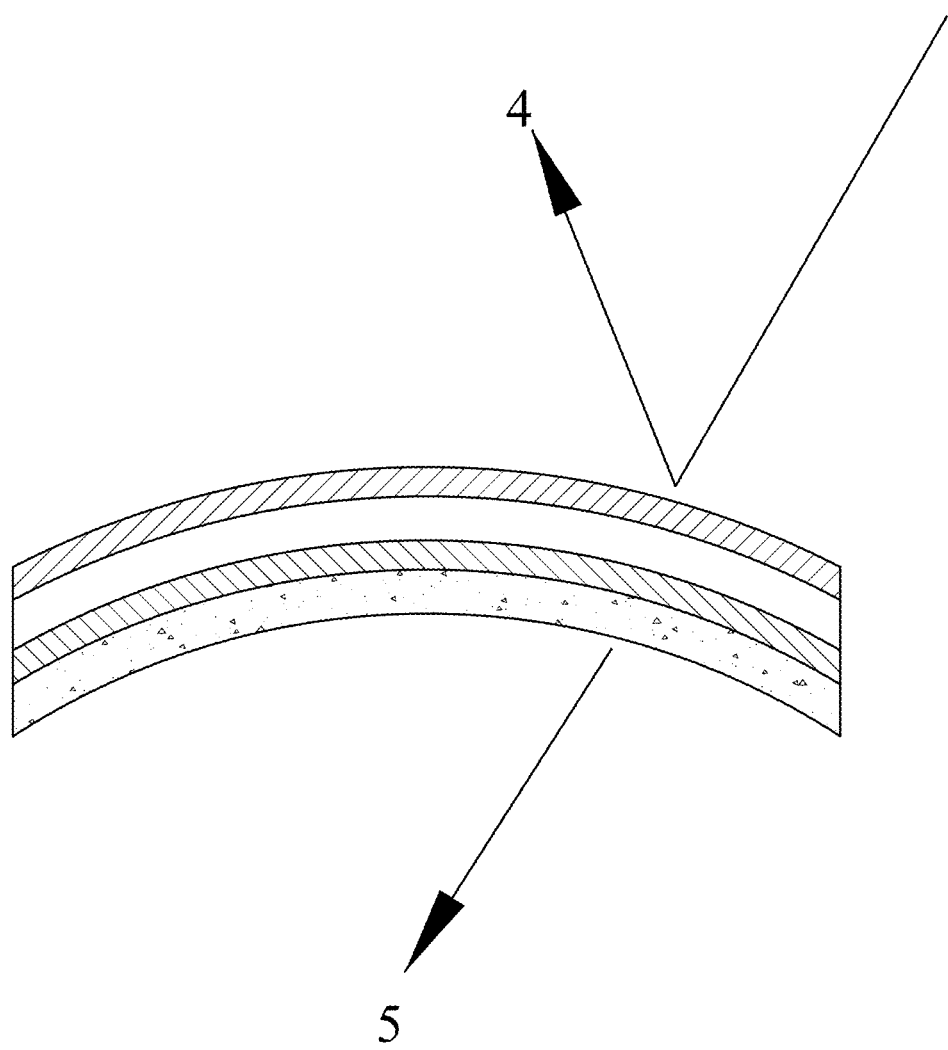
FIG. 2 shows a schematic diagram of a lens with blue reflective appearance and balance chroma enhancement visual perception light.
Figure 3:
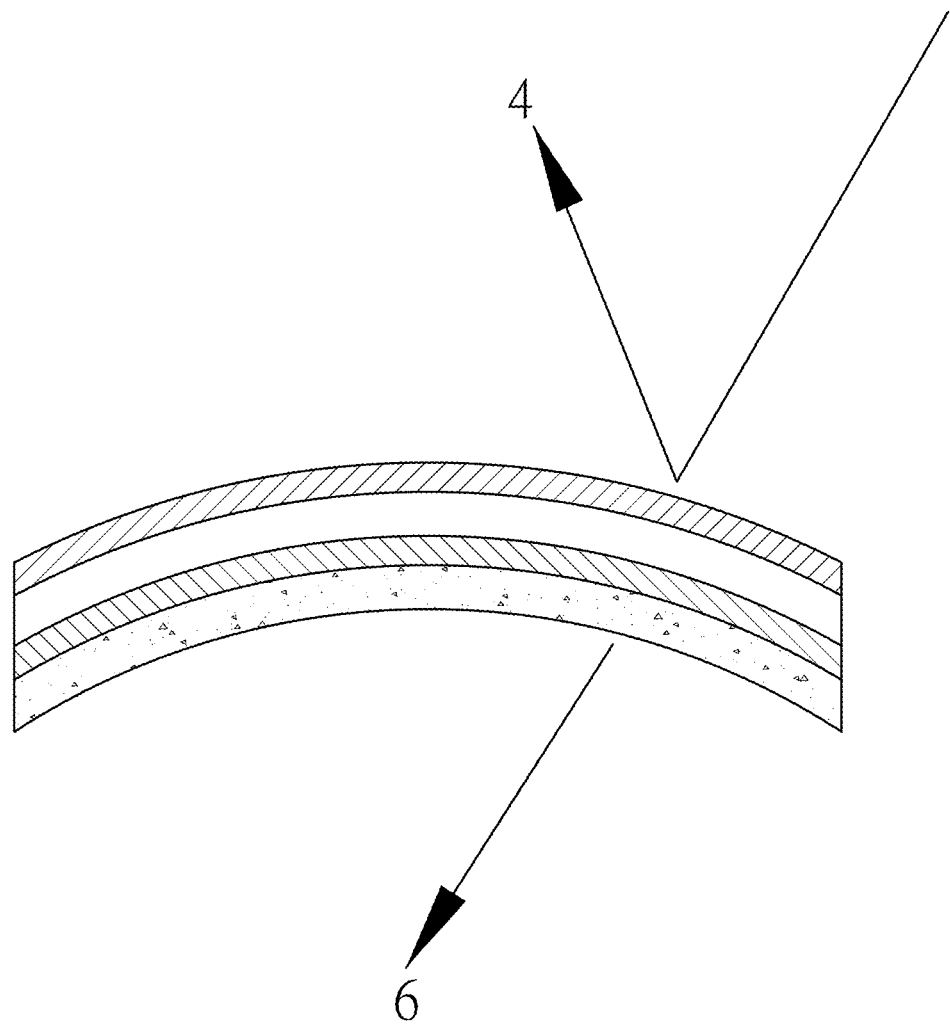
FIG. 3 shows a schematic diagram of a lens with predefined blue reflective appearance and yellow visual perception light.

However, the demand for glasses is not limited to its function; the appearance and color of the glasses and the wearing visual experience are also important factors when consumers choose a pair of glasses. FIG. 2 shows a schematic diagram of a lens with blue reflective appearance 4 and balance chroma enhancement 5 visual perception light. Moreover, FIG. 3 shows a schematic diagram of a lens with predefined blue reflective appearance 4 and yellow 6 visual perception light.

Figure 4:
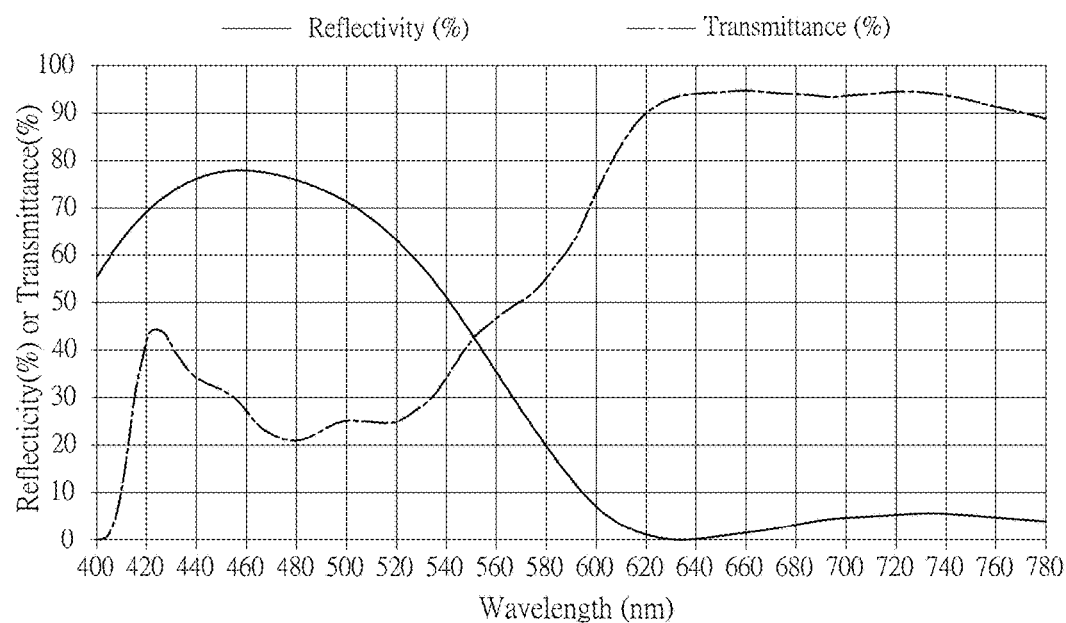
FIG. 4 shows a spectrum diagram of a prior art lens having blue reflective appearance and yellow visual perception therein.

When the color dye is used to absorb transmitted light and to adjust the hue of the lens, the colors on both surfaces of the lens will be fixed and will be the same; that is, when a consumer selects a color of a spectacle lens, the visual sensation colors will be the same. Likewise, if the consumer chooses a metallic luster color-coated eyewear lens, such as a blue appearance, the internal visual sensation color of the lens will turn into yellow, as shown in FIG. 3. By measuring the lens in a laboratory using a spectrophotometer, a spectrum of blue reflection appearance and a yellow overall transmittance spectrum of visual perception can be obtained, as shown in FIG. 4.

Figure 5:
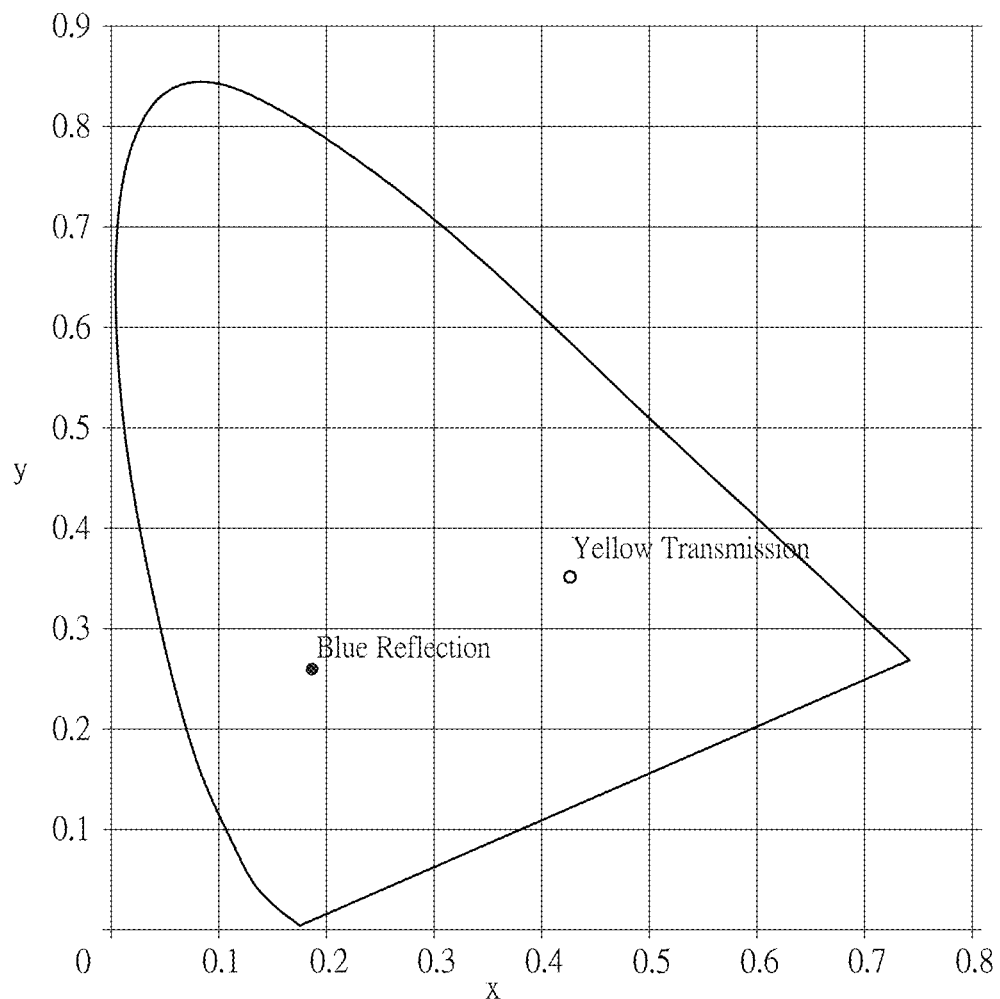
FIG. 5 shows a CIE 1931 XY chromaticity diagram of a prior art lens having blue reflective appearance coating and yellow visual perception.

At the same time, the spectrophotometer is able to convert the reflection and transmittance colors of the lens into the CIE 1931 XY color space chromaticity diagram in the D65 standard light source. Taking the above prior art as examples, the chromaticity coordinates of blue appearance reflected spectrum is: (x, y)=(0.18, 0.26); and the chromaticity coordinates of yellow perception transmittance spectrum is: (x, y)=(0.42, 0.35), which is plotted on the CIE 1931 XY color space chromaticity diagram, as shown in FIG. 5.

Figure 6:
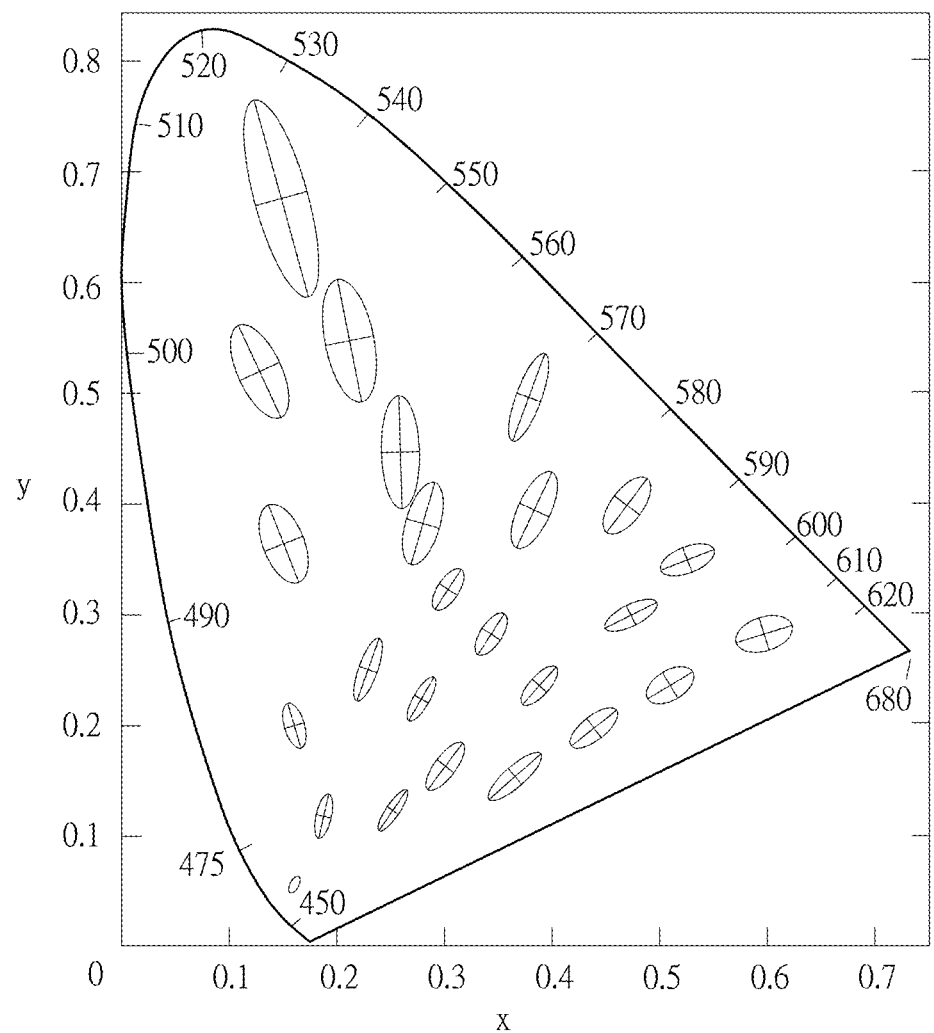
FIG. 6 shows a CIE 1931 XY chromaticity diagram of MacAdam elliptical experimental results.

How to distinguish different colors or neutral white has become an interesting issue. David L. MacAdam published a paper in the 1942, indicating that the human eye can distinguish the same color or white range. Different sizes of ellipses can be defined in the CIE 1931 XY color space chromaticity coordinates, as shown in FIG. 6.

Figure 7:
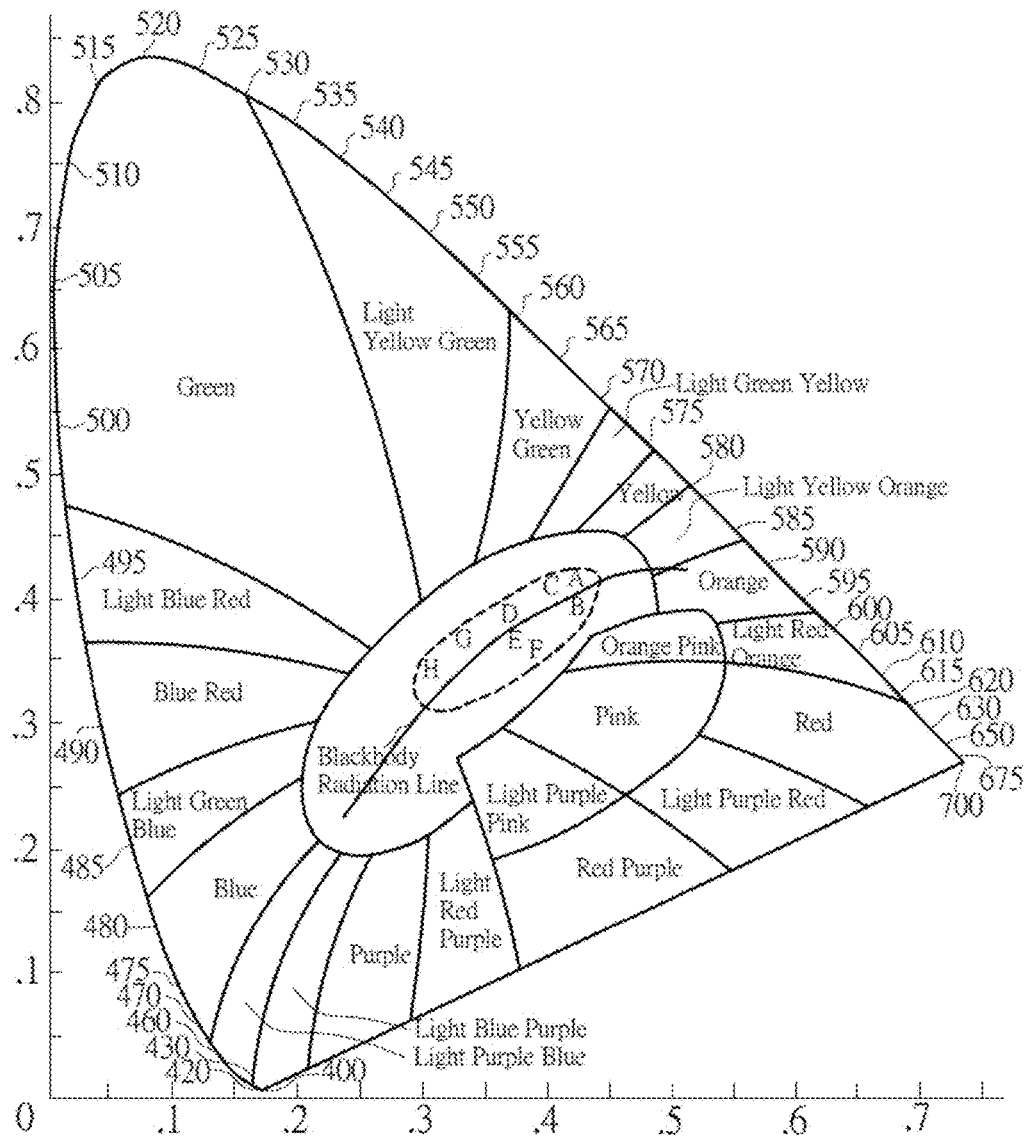
FIG. 7 shows a CIE 1931 XY chromaticity diagram of the ICI color system.

In addition, according to FIG. 2 in U.S. Pat. No. 4,176,299 published in 1978, a ICI color system diagram is defined in the CIE1931 XY color chromaticity coordinates, and the light source within the range defined by the dashed line will be viewed by the human eye as close to the white light. The results are cited in FIG. 7.

Therefore, referring to the literature of colorology and comparing the lens product color coordinates (x, y) with the human eye test results, the present disclosure can be concluded that the perceived tone neutral balance color coordinate range can be defined in the inside of the elliptical parametric equation in the CIE 1931 XY color space chromaticity coordinate system; In contrast, the color coordinates located outside of this elliptical parametric equation can be defined as a lens with colored appearance or with colored visual perception. As such the elliptical parameter equation (1) is expressed as follows:

$$\begin{cases} x = a\cos(t)\,\cos(\theta) - b\sin(t)\,\sin(\theta) + h \\ y = a\cos(t)\,\sin(\theta) + b\sin(t)\,\cos(\theta) + k \end{cases} \quad (1)$$

where: t is the radian parameter is between 0~2π;
  θ is the elliptical rotating radian (0.66);
  a, b are two radii of an ellipse (a is 0.07, b is 0.04);
  h and k are the elliptical center coordinates, that is, (h, k)=(0.34, 0.32).

Figure 8:
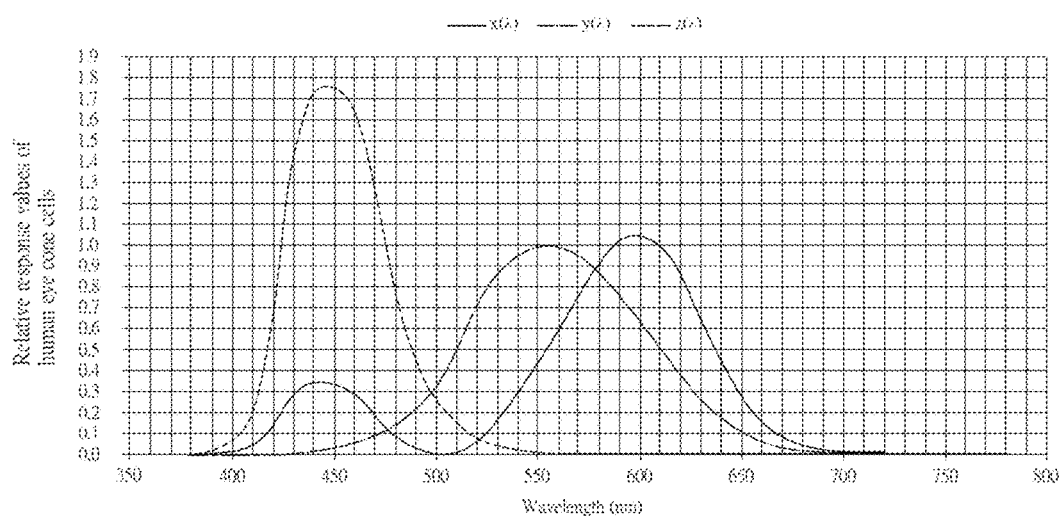
FIG. 8 shows a spectrum diagram of the relative response values of human eye cone cells at each wavelength.

It is worth noting that the best neutral balance ellipse radius a, b is derived from the literature and the measured data regression of lens products; the rotating radians θ is roughly parallel to the black body radiation line; and the equivalent energy point (x, y)=(0.33, 0.33). However, since the human eye cone cells are more sensitive to the green light, and are less sensitive to blue light having a wavelength that is small than 420 nm and red light having a wavelength that is big than 700 nm (please refer to FIG. 8), and with the results of the human eye get used to the color temperature, the elliptical center coordinates h, k are slightly offset, such as (0.34, 0.32).

Figure 9:
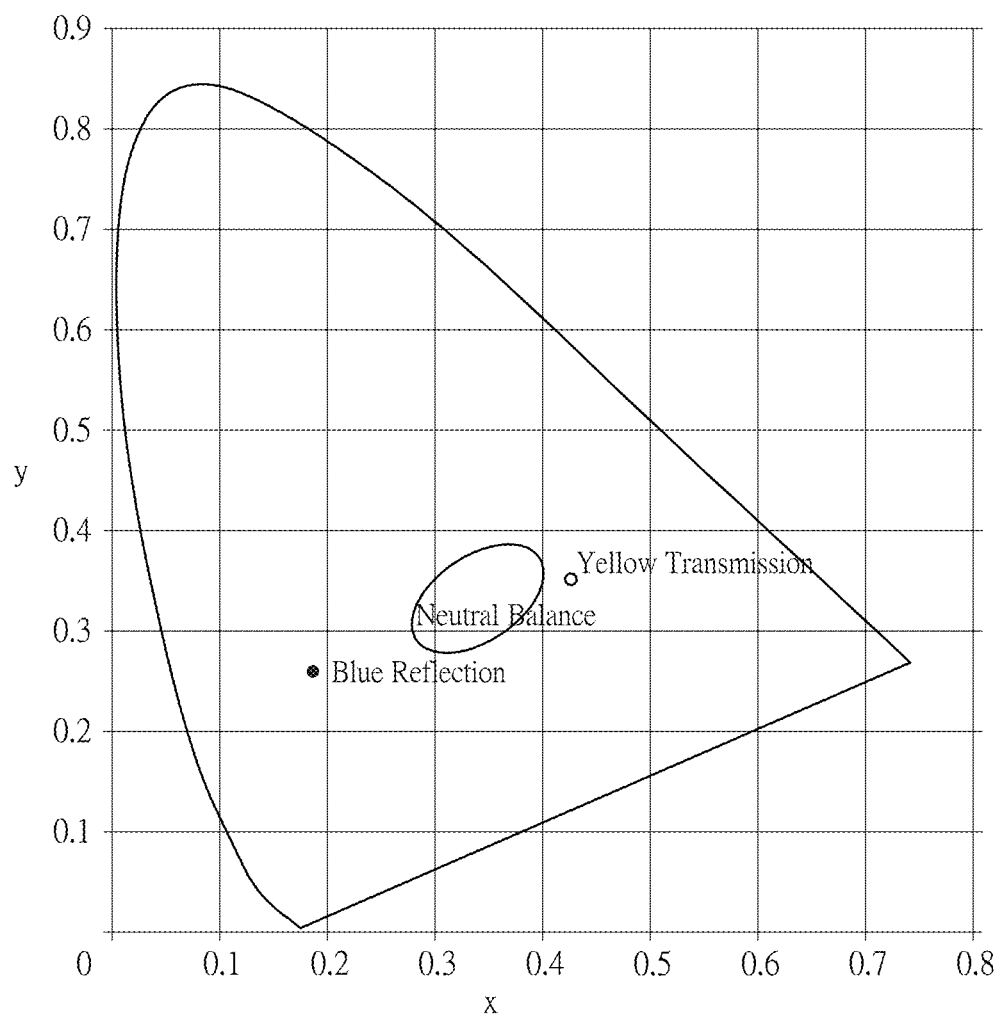
FIG. 9 shows a CIE 1931 XY chromaticity diagram of a prior art lens that the blue reflective appearance color coordinates and the yellow visual perception color coordinates are located outside the neutral balance ellipse.

Plot the neutral balance elliptical parameter equation in the CIE 1931 XY color space chromaticity coordinate system and compared with FIG. 5, both of the chromaticity coordinates of blue appearance reflected light and the chromaticity coordinates of yellow perception transmittance light located outside of the neutral balance ellipse, as shown in FIG. 9.

On the other hand, advances in sunglasses technology have begun to emphasize that the scenery seen under sunlight has the function of enhancing color contrast by stimulating the wearer through a lens based on adjusting the relative optical transmission of a lens to three primary colors (red, green and blue) of the human eye's cones (please refer to FIG. 8) in the visible region of visible light.

Since U.S. Pat. No. 4,826,286 discloses a filtering system, the patent uses the interference coating to archive the light filter effect, the light which is filtered by the interference coating will be transformed into the reflective light so as to show a fixed (usually gray) appearance color of a lens. Such prior art does not provide customers with the choice of a variety of lens appearances and also does not have the effect of enhancing the exterior color with chromaticity. Moreover, the US patent does not disclose the lens visible light spectrum that is measured by a spectrophotometer.

Figure 10:
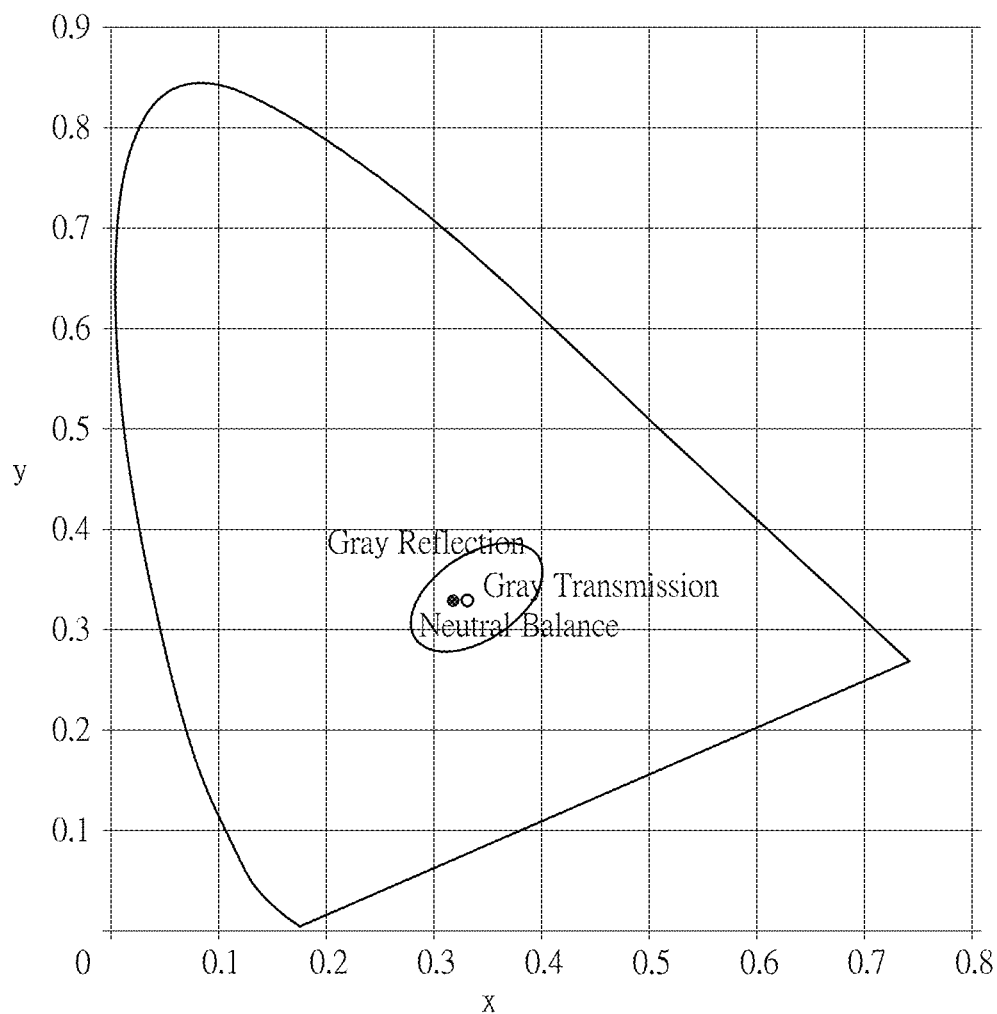
FIG. 10 shows a CIE 1931 XY chromaticity diagram of the lens of a comparative example 1 that the gray reflective appearance color coordinates and the gray visual perception color coordinates are located inside the neutral balance ellipse.
Figure 11:
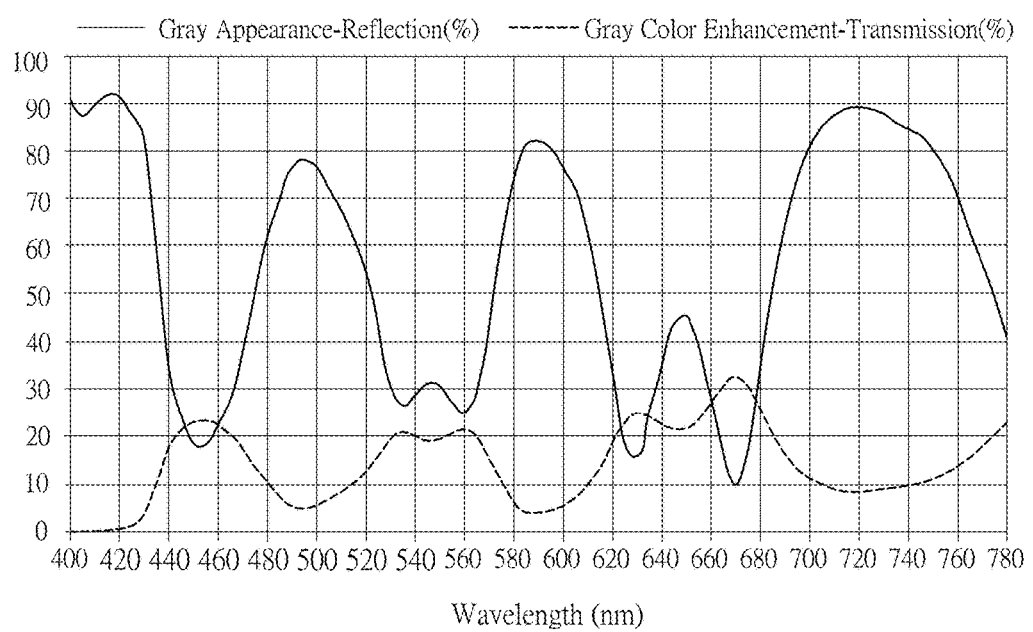
FIG. 11 shows a spectrum of the reflective appearance light and the overall transmittance light of the lens of the comparative example 1.

In addition, U.S. Pat. No. 8,733,929 (comparative example 1) discloses a glass substrate together with a gray reflective appearance polarized sunglass that has the chroma enhancement function. The filter layer of the lens is composed of interference coating to maintain the neutral balance tone by visual perception and also the overall transmittance light spectrum has three pass-bands corresponding to the maximum response of the human eye cone cells. As such, such lens has a neutral balance visual perception with chroma enhancement function in all color space (between red-green complementally and between blue-yellow complementally) by seeing through the lenses but its reflective appearance is fixing gray. Roughly turn the disclosure overall transmittance light spectrum into reflective light spectrum and then calculated the reflective appearance color coordinates is (x, y)=(0.32,0.33), and the overall transmittance light color coordinates is (x, y)=(0.33,0.33), then plotted in a CIE 1931 XY chromaticity diagram and compare to the neutral balance ellipse which the present disclosure. FIG. 10 shows a CIE 1931 XY chromaticity diagram of compared 1 lens that the gray reflective appearance color coordinates and the gray visual perception color coordinates are located inside the neutral balance ellipse. FIG. 11 shows a spectrum of the reflective appearance light and the overall transmittance light of the compared 1lens.

Moreover, U.S. Pat. No. 7,556,376 and JP Patent JP2013-083839A disclose that the effect of filtering can be achieved by mean of adding different color dyes in a resin lens (for example, polycarbonate lens) that absorbs a specified wavelength light so as to enable the overall transmittance light to have relatively high or low intensity pass-bands (Blue or Green). When the color dye is used to absorb the transmittance light and to adjust the hue of the lens, the colors on both sides of the lens will be fixed and will be the same. If a metallic luster layer is coated on the front surface of the lens, such as a blue appearance (comparative example 2), the internal visual sensation color of the lens will turn into yellow, as such, both of the red and green color turns yellow and the chroma enhancement effect of blue color is negative so as not to have the best balance color contrast enhancement function corresponding to the three primary colors (RGB color stimulation) of eye cone cells.

Figure 12:
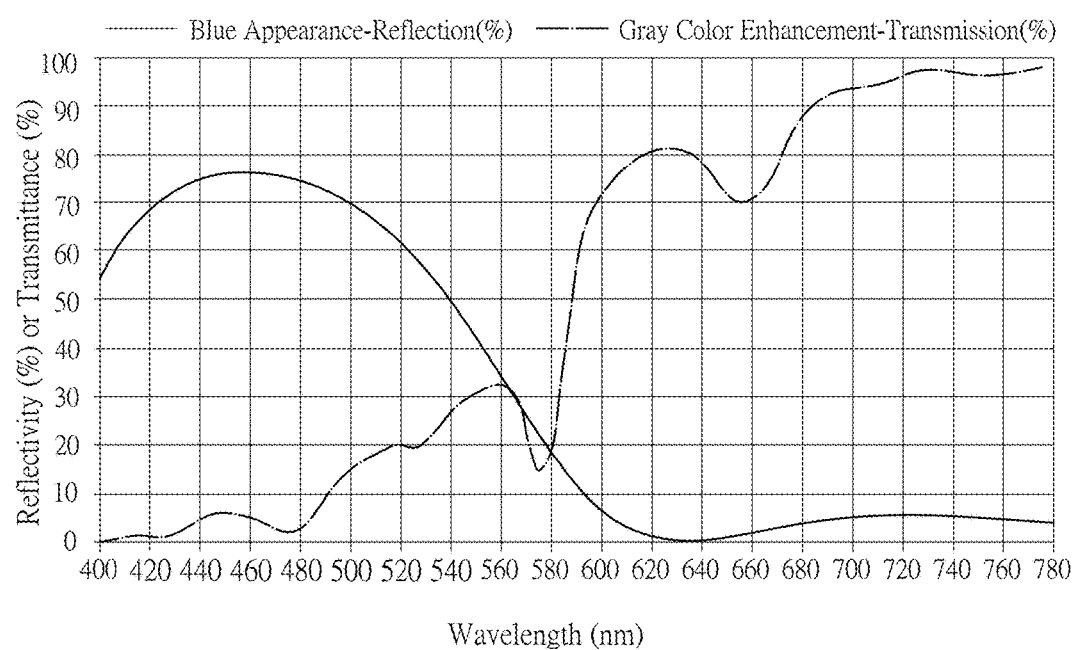
FIG. 12 shows a spectrum of the blue reflective appearance light and the yellow overall transmittance light of the lens of a comparative example 2.
Figure 13:
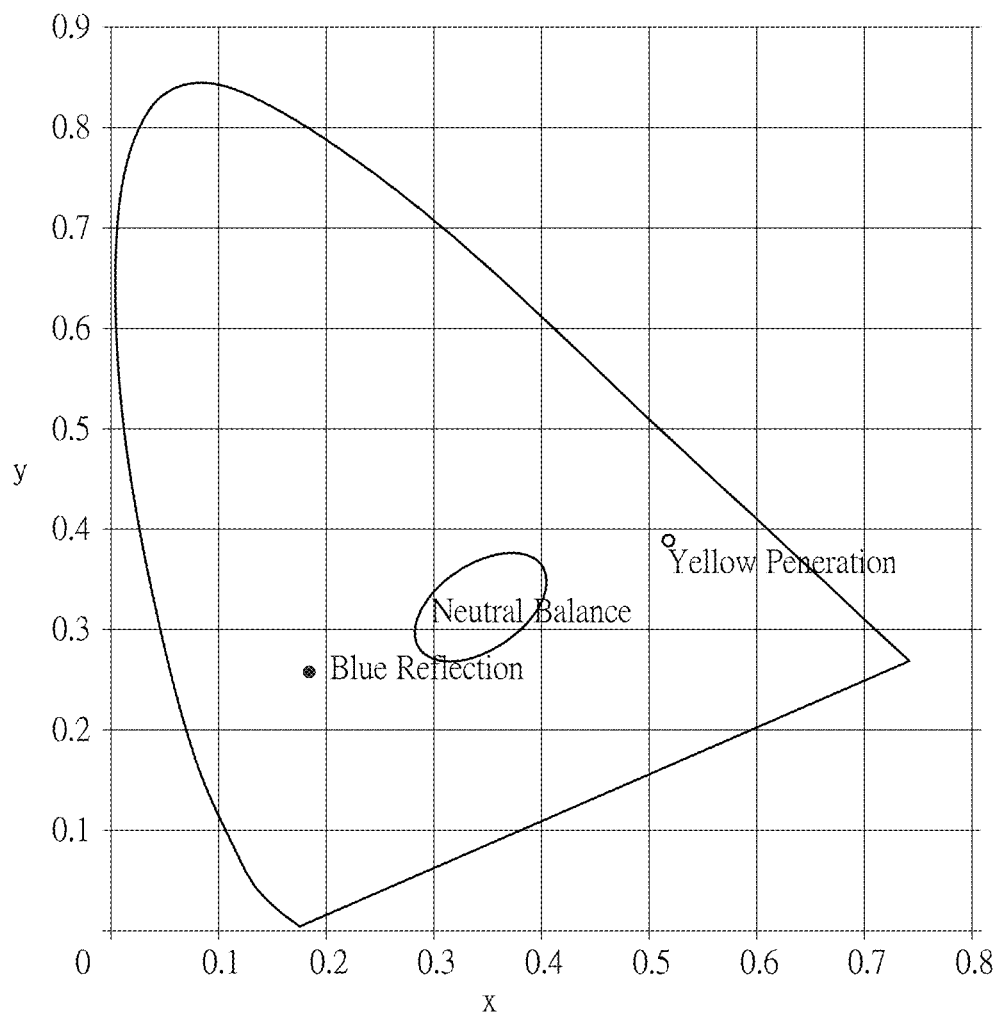
FIG. 13 shows a CIE 1931 XY chromaticity diagram of the lens of the comparative example 2 that the blue reflective appearance color coordinates and the yellow visual perception color coordinates are located outside the neutral balance ellipse.

Measured by spectrophotometer to obtained a spectrum of the blue reflective appearance light and the yellow overall transmittance light of the compared 2lens, shows as FIG. 12. Similarly, obtained its reflective light color coordinates (x, y)=(0.18, 0.26) and overall transmittance light color coordinates (x, y)=(0.52, 0.49) in CIE 1931 XY chromaticity diagram and compared to the neutral balance ellipse, shows as FIG. 13.

Hereinafter are the detailed descriptions of the embodiments 1, 2 and 3 of the present disclosure.

Figure 14:
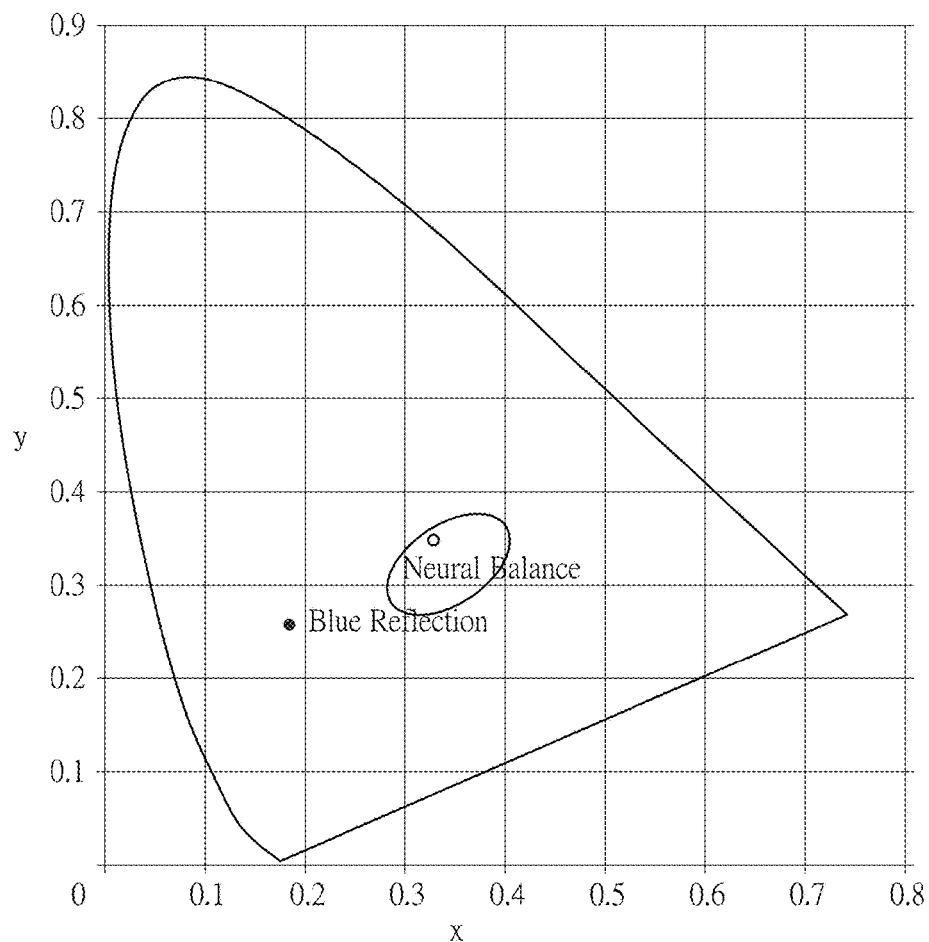
FIG. 14 shows a CIE 1931 XY chromaticity diagram of the present disclosure lens that the blue reflective appearance color coordinates is locate outside and the balance chroma enhancement visual perception color coordinates is located inside of the neutral balance ellipse.
Figure 15:
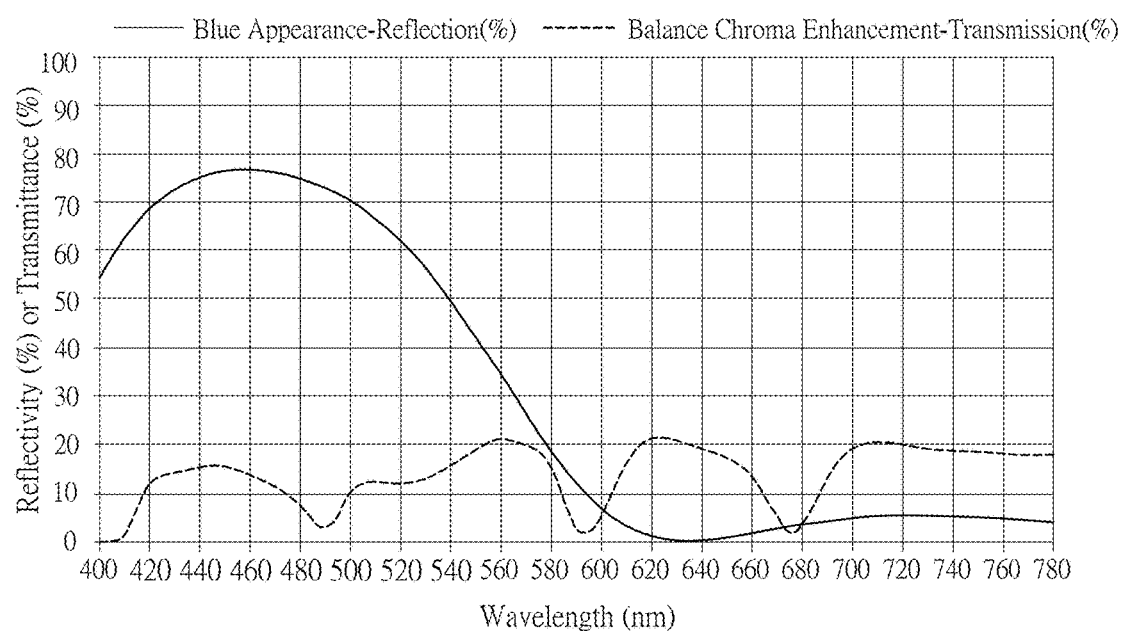
FIG. 15 shows a spectrum of the lens of the present disclosure that the blue reflective appearance and the spectrum of its overall transmittance light has three balance chroma enhancement pass-bands corresponding to the maximum response of the human eye cone cells.

[Embodiment 1] a Blue Reflective Appearance Polycarbonate Plano Lens with Balance Chroma Enhancement Visual Perception First of all, different color dye powders (Bayer Chemical MARCOLEX Series) in an appropriate proportion of blending are used to bluish (complementary to yellow) and to enable the color spectrum to have three pass-bands corresponding to the maximum response of the human eye cone cells dyeing powder formula, and are coupled with carbon black (J&JH Company) to adjust the gray scale, thereby pre-mixing together with polycarbonate (PC) optical resin (Tei Jin Chemical LTD. Panlite Series) to pumping granulation. The dyeing PC granulation is used as a raw material, and injection molding is used to make plano semi-finish lenses. A surface hardening procedure is adopted to increase the wear resistance of PC lenses. In a vacuum vapor deposition machine, by using two kinds of stacked materials Ti3O5 and SiO2, several optical interference layers are constituted to form a blue reflective appearance coating on the convex surface of lenses. Please refer to FIG. 18, preferably, the anti-reflective coating may be applied to the concave surface of the lenses with the same machine and materials. Finally, measured the embodiment 1 lens by a spectrophotometer to confirm that the blue reflective appearance chromaticity coordinates (Rx, Ry)=(0.18, 0.26) located outside and the overall transmittance chromaticity coordinates (Tx, Ty)=(0.32, 0.34) in the CIE1931 chromaticity diagram located inside of the neutral balance ellipse in the D65 standard light source, as shown in FIG. 14; and FIG. 15 shows the spectrum of the lens of embodiment 1 that the blue reflective appearance and the spectrum of its overall transmittance light have three balance chroma enhancement pass-bands corresponding to the maximum response of the human eye cone cells.

This eyewear lens has predefined different reflective appearance colors with balance chroma enhancement visual perception. With regard to the overall stylish modeling of consumers, when joining some activities (such as party, driving, cycling, fishing, running etc. . . . ), wearing a pair of glasses together with balance chroma enhancement visual perception is a good choice.

[Embodiment 2] a Blue Reflective Appearance Polarizing Prescription Sunglasses Lens with Balance Chroma Enhancement Visual Perception Referring to Embodiment 1 of the present disclosure, different color dye powders (Bayer Chemical MARCOLEX Series) in an appropriate proportion of blending are used to bluish (complementary to yellow) and to enable the color spectrum to have three pass-bands corresponding to the maximum response of the human eye cone cells dyeing powder formula, and are coupled with carbon black (J&JH Company) to adjust the gray scale, thereby pre-mixing together with polycarbonate (PC) optical resin (Tei Jin Chemical LTD. Panlite Series) to pumping granulation. The dyeing PC granulation is used as a raw material; using a polarizer and the prepared polycarbonate (PC) resin form a semi-finished lens by an in-mold injection process. The polarizer is bonded to the convex surface of the lens. According to the custom prescription cutting and polishing the concave surface of the lens; by means of the spin coating process the concave surface is hardened, thereby increasing its wear characteristics. The lens is placed in a vacuum deposition machine to form a blue reflective appearance coating on the convex surface of the lens. Please refer to FIG. 19, preferably, the anti-reflective coating may be applied to the concave surface of the lenses with the same machine and materials. Finally, the overall transmittance of the lens is measured by a spectrophotometer to confirm that the chromaticity coordinates in the CIE1931 chromaticity diagram are within the neutral balance ellipse in the D65 standard light source.

[Embodiment 3] a Blue Reflective Appearance Photochromatic Prescription Sunglasses Lens with Balance Chroma Enhancement Visual Perception Based on a photochromatic semi-finished lens (PPG Chemical Company Trivex Series) and according to the custom prescription (cutting and polishing the concave surface of the lens), by means of the spin coating process, the surface is hardened, thereby increasing its wear characteristics. The lens is placed in a vacuum deposition machine to form a blue reflective appearance coating on the convex surface of the lens and to form another interference coating (complementary to the total transmitted light of the first convex coating and the lens substrate and its spectrum has three pass-bands corresponding to the maximum response of the human eye cone cells) on the concave surface of the lens. Please refer to FIG. 20, finally, the overall transmittance of the lens is measured by a spectrophotometer under exposure to UV light to confirm that the chromaticity coordinates in the CIE1931 chromaticity diagram are within the neutral balance ellipse in the D65 standard light source.

Figure 16:
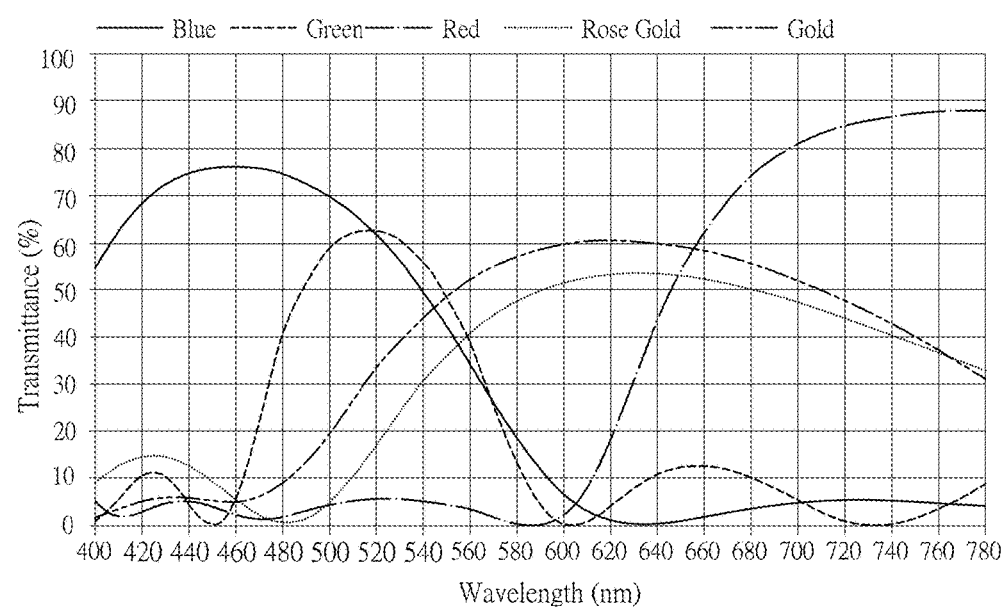
FIG. 16 shows spectrums of some popular appearance color sunglasses lenses produced by interference coating.
Figure 17:
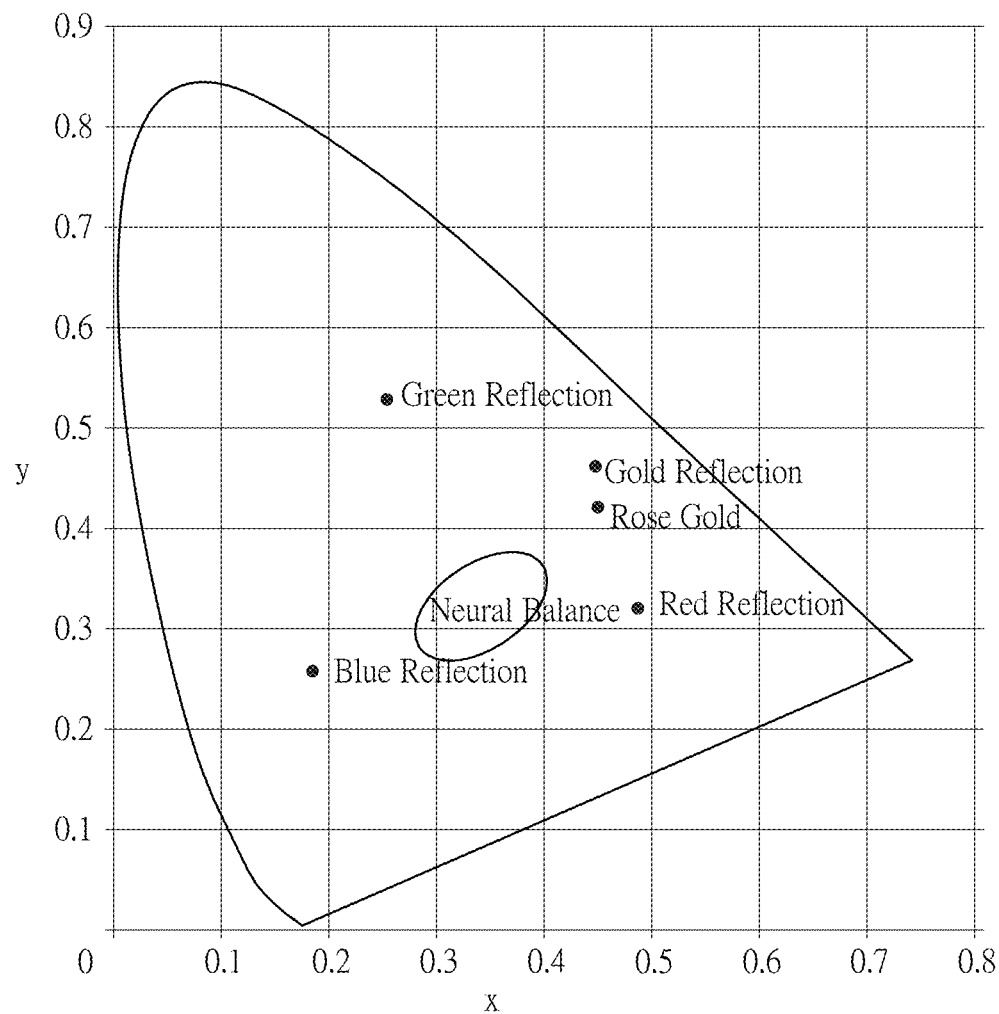
FIG. 17 shows a CIE 1931 XY chromaticity diagram of all different lens color coordinates located outside the neutral balance ellipse.

Although an optical interference coating with a blue reflective appearance is used in all the embodiments of the present disclosure, some other popular appearance colors will be coated on the sunglasses. Their reflection spectra are shown in FIG. 16. Their chromaticity coordinates are located outside the neutral balance ellipse in the CIE 1931 XY chromaticity diagram, as shown in FIG. 17. According to the appropriate complementary dye formulation, the color filter and interference coating and the processes described above, the chromaticity coordinates of the overall transmitted light of the lenses will fall within the neutral balance ellipse in the CIE 1931 XY chromaticity diagram. Moreover, the overall transmittance light spectrum has blue, green and red pass bands corresponding to three primary colors (RGB color stimulation) of human cone cells with relative high intensity. As such, the balance chroma enhancement function in all color space (between red-green complementary and between blue-yellow complementary) can be sensed by seeing through the lenses.

Figure 18:
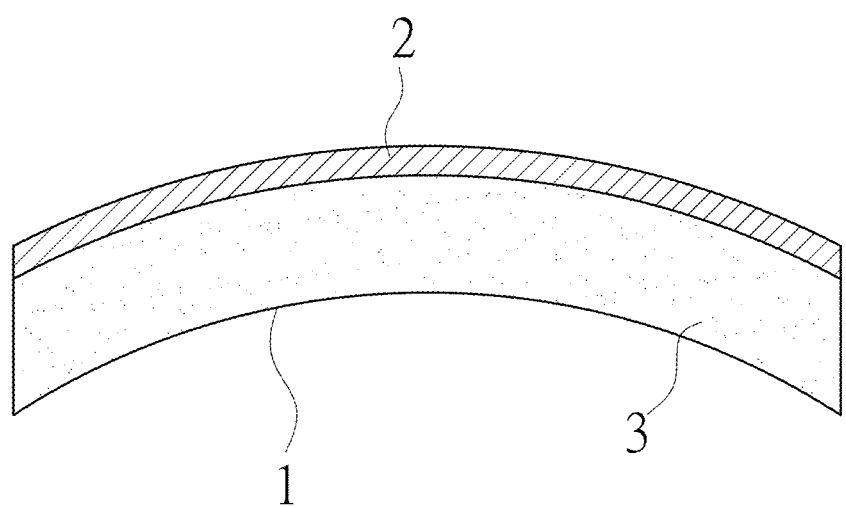
FIG. 18 shows a cross-sectional view of a lens according to an embodiment of the present disclosure, wherein a lens substrate is formed by a pre-mixed optical material and a dye, and then the optical interference coating is bonded to the surface of the lens substrate.
Figure 19:
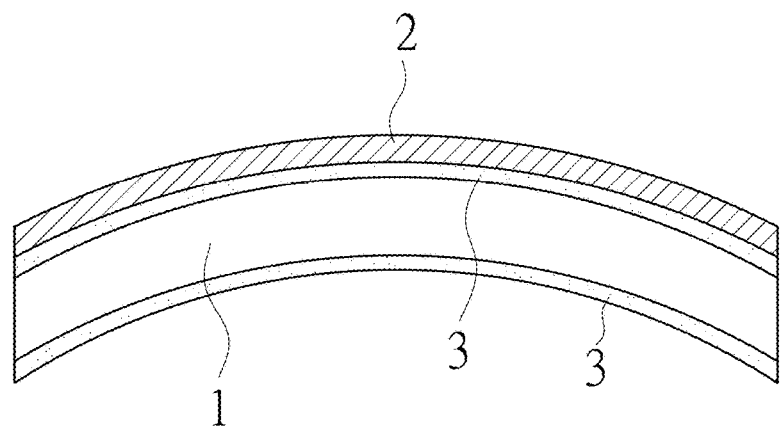
FIG. 19 shows a cross-sectional view of a lens according to an embodiment of the present disclosure, wherein the dye is bonded to both sides of the lens substrate by the dipping process or the painting process, and then the optical interference coating is bonded to the surface of the lens substrate.

FIG. 18 shows a cross-sectional view of a lens according to an embodiment of the present disclosure, wherein a lens substrate 4 is formed by a pre-mixed optical material and a dye 6, and then the optical interference coating 5 is bonded to the surface of the lens substrate 4. FIG. 19 shows a cross-sectional view of a lens, wherein the dye 6 is bonded to both sides of the lens substrate by the dipping process or the painting process, and then the optical interference coating 5 is bonded to the convex surface of the lens 4.

Figure 20:
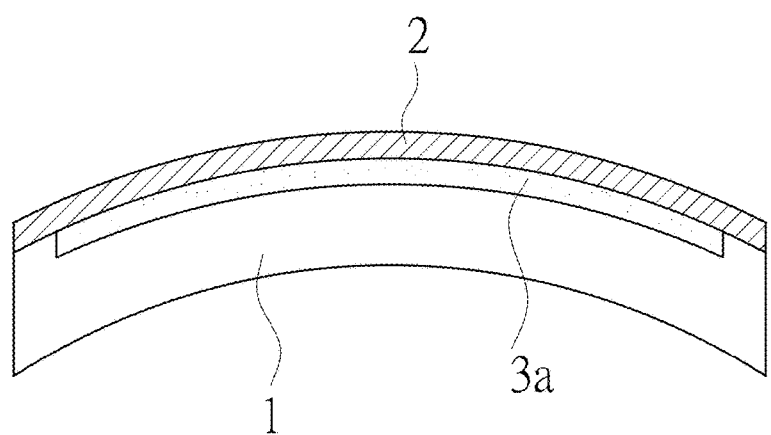
FIG. 20 shows a cross-sectional view of a lens according to an embodiment of the present disclosure, wherein the color filter sheet is bonded to the front surface of the lens substrate by in-mold injection molding, and then the optical interference coating is bonded to the surface of the lens substrate.
Figure 21:
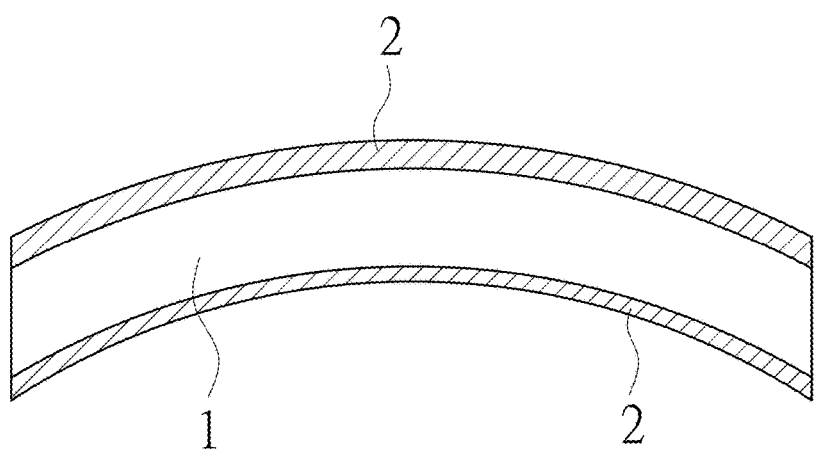
FIG. 21 shows a cross-sectional view of a lens according to an embodiment of the present disclosure, wherein the reflective interference coating is bonded to the front surface of the lens substrate and the complementary interference coating is bonded to rear surface thereof.
Figure 22:
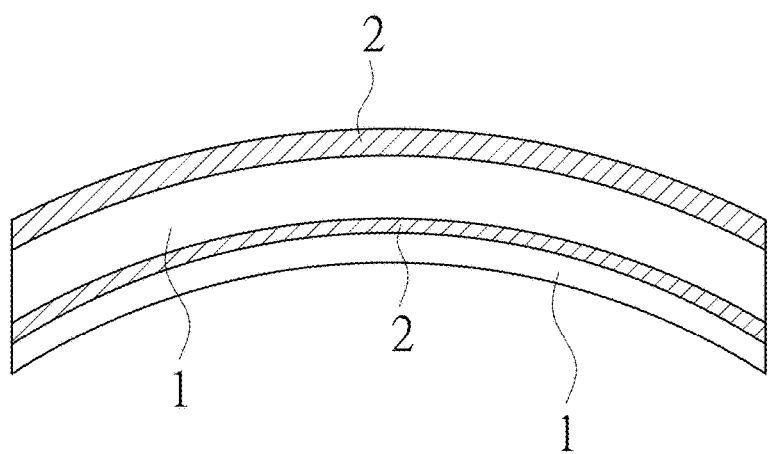
FIG. 22 shows a cross-sectional view of a lens according to an embodiment of the present disclosure, wherein a lens substrate having an reflective interference coating is bonded to another lens substrate having a complementary optical interference coating.

In addition, FIG. 20 shows a cross-sectional view of a lens. The color filter sheet 6a is bonded to the front surface of the lens substrate 4 by in-mold injection molding, and then the optical interference coating 5 is bonded to the surface of the lens 4. FIG. 21 shows a cross-sectional view of a lens. The reflective interference coating 5 is bonded to the convex surface of the lens substrate 4 and the complementary interference coating 6b is bonded to rear surface thereof. FIG. 22 shows a cross-section view of a lens. A lens substrate 4 having a reflective interference coating 5 is bonding to another lens substrate 4 having a complementary interference coating 6b.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. A predefined reflective appearance eyewear lens with chroma enhanced visual perception, comprising:
a lens substrate and an optical interference coating,
wherein the lens substrate is comprised of an optical material, the optical interference coating is bonded to the lens substrate and is stacked by means of high and low reflective index materials, light passes through the optical interference coating to produce a reflective appearance color predefined,
wherein at least one side surface of the lens substrate, both side surfaces of the lens substrate or inside of the lens substrate comprises at least another filter and its filtered light is complementary to the light after passing through the optical interference coating to maintain the overall transmittance light color neutral balance of the lens, and the overall transmittance light spectrum has three pass-bands corresponding to the maximum response color of the human eye cone cells, and the relatively high transmittance values of the center of each pass-band are at 420 nm~480 nm, 500 nm~560 nm, and 580 nm~640 nm, the full width at half maximum (FWHM) of each pass-band is between 3 nm and 50 nm,
wherein the reflected light spectrum chromaticity coordinates (Rx, Ry) of the reflective appearance color are located within the outside of a neutral balance elliptical parameter equation in the CIE 1931 XY color space chromaticity coordinates, and the overall transmittance spectrum chromaticity coordinates (Tx, Ty) of a lens are located within the inside of the neutral balance elliptical parameter equation in the CIE 1931 XY color space chromaticity coordinates, wherein the elliptical parameter equation is expressed as follows:

$$x = a\cos(t)\cos(\Theta) - b\sin(t)\sin(\Theta) + h$$

$$y = a\cos(t)\sin(\Theta) + b\sin(t)\cos(\Theta) + k$$

where:
t is the radian parameter between 0~2π;
Θ is the elliptical rotating radian (0.66);
a, b are two radii of an ellipse (a is 0.07, b is 0.04);
h and k are the elliptical center coordinates, that is, (h, k)=(0.34, 0.32).

2. The lens of claim 1, wherein the overall transmittance spectrum has three pass-bands of 420 nm~480 nm, 500 nm~560 nm, and 580 nm~640 nm, and the relatively high transmittance value being at the center of each pass-band being at least 5% greater than the transmittance value on both bottom sides of each pass-band.

3. The lens of claim 1, wherein the reflective appearance color of the lens is produced by the optical interference coating and another filter layer contained in the lens substrate is comprised of at least one dye.

4. The lens of claim 3, wherein the dye is combined with the lens substrate by mean of dipping, painting or pre-mixing.

5. The lens of claim 3, wherein the dye has a polarizing effect.

6. The lens of claim 3, wherein the dye has a photochromic effect.

7. The lens of claim 1, wherein the reflective appearance color of the lens is produced by the optical interference coating and another filter layer contained in the lens substrate is comprised of at least one color filter sheet.

8. The lens of claim 7, wherein the color filter sheet is combined with the lens substrate by in-mold casting, in-mold injection or laminating adhesive.

9. The lens of claim 7, wherein the color filter sheet has a polarizing effect.

10. The lens of claim 7, wherein the color filter sheet has a photochromic effect.

11. The lens of claim 1, wherein the reflective appearance color of the lens is produced by the optical interference coating and another filter layer contained in the lens substrate is comprised of another optical interference coating.

12. The lens of claim 11, wherein the optical interference coating is combined with the lens substrate by vacuum vapor deposition or spinning coating.

13. The lens of claim 1, wherein the material of the lens substrate is a polymeric resin or a glass.

14. The lens of claim 1, wherein the lens substrate is formed by casting molding, injection molding or cutting and polishing.

15. The lens of claim 1, wherein the lens substrate is a plano lens, a semi finished lens or a prescription lens.

16. The lens of claim 1, wherein the lens is suitable for use in sunglasses, sport eyewear, safety goggles, swimming goggles or skiing goggles.

* * * * *